US012717045B2

(12) United States Patent
Densil

(10) Patent No.: US 12,717,045 B2
(45) Date of Patent: Aug. 25, 2026

(54) TECHNIQUES FOR USING SATELLITES TO AID IN GEOGRAPHICAL POSITION DETERMINATION

(71) Applicant: Honeywell International Inc., Charlotte, NC (US)

(72) Inventor: Jonathan Densil, Minneapolis, MN (US)

(73) Assignee: Honeywell International Inc., Charlotte, NC (US)

( * ) Notice: Subject to any disclaimer, the term of this patent is extended or adjusted under 35 U.S.C. 154(b) by 295 days.

(21) Appl. No.: 18/644,453

(22) Filed: Apr. 24, 2024

(65) Prior Publication Data

US 2025/0334703 A1 Oct. 30, 2025

(51) Int. Cl.

*G01S 19/21* (2010.01)
*G01S 19/38* (2010.01)
*G01S 19/47* (2010.01)

(52) U.S. Cl.

CPC ............ *G01S 19/21* (2013.01); *G01S 19/215* (2013.01); *G01S 19/38* (2013.01); *G01S 19/47* (2013.01)

(58) Field of Classification Search

CPC ........ G01S 19/21; G01S 19/215; G01S 19/38; G01S 19/47; G01S 19/49

See application file for complete search history.

(56) References Cited

U.S. PATENT DOCUMENTS 6,275,677 B1 * 8/2001 Tandler .................. H04B 7/195 455/430
2016/0061598 A1 * 3/2016 McNair ................ B64G 1/2427 702/155
2021/0333411 A1 10/2021 Gum et al.
2023/0105097 A1 4/2023 Reimer et al.
2023/0375659 A1 11/2023 Neinavaie et al.
2024/0142557 A1 * 5/2024 Peng ....................... G01S 19/21

FOREIGN PATENT DOCUMENTS

WO WO-2005081011 A2 * 9/2005 ............. G01S 19/21

OTHER PUBLICATIONS

B. McLemore et al., Navigation Using Doppler Shift From LEO Constellations and INS Data, IEEE Transactions on Aerospace and Electronic Systems, vol. 58(5), p. 4295-4314 (Year: 2022).*

European Patent Office, "Extended European Search Report", dated Sep. 17, 2025, from EP Application No. 25167444.6, from Foreign Counterpart to U.S. Appl. No. 18/644,453, pp. 1 through 8, Published: EP.

Bennett et al., "Large Constellations of Low-Altitude Satellites: A Primer", Congressional Budget Office, May 2023, pp. Cover through 25.

(Continued)

*Primary Examiner* — Resha Desai
*Assistant Examiner* — Fred H Mull
(74) *Attorney, Agent, or Firm* — Fogg & Powers LLC

(57) ABSTRACT

Techniques are provided for more accurately determining a geographical position of a body when Global Navigation Satellite System (GNSS) signals are jammed and/or spoofed. In the absence of valid GNSS data, data about beacon signals emitted by a plurality of satellites and each of the plurality of satellites is used with inertial measurement data to estimate the body's geographical position.

20 Claims, 4 Drawing Sheets

(56) References Cited

OTHER PUBLICATIONS

Humphreys et al., “Signal Structure of the Starlink Ku-Band Downlink”, eess.SP, Aug. 30, 2023, arXix:2210.11578v3, pp. 1 through 14.

Kassas et alia, “New-Age Satellite-Based Navigation STAN: Simultaneous Tracking and Navigation with LEO satellite Signals”, Inside GNSS, Aug. 17, 20219, pp. 1 through 44.

Neinavaie et al., “Detection of Constrained Unknown Beacon Signals of Terrestrial Transmitters and LEO Satellites with Application to Navigation”, 2022 IEEE 96th Vehicular Technology Conference (VTC2022-Fall), London, United Kingdom, 2022, pp. 1 through 5.

Rhodes, “sgp4 2.23”, as downloaded Jan. 24, 2024 from https://pypi.org/project/sgp4/, pp. 1 through 20.

Space-Track, “Basic Description of the Two Line Element (TLE) Format”, as downloaded Jan. 24, 2024 from Space-Track.org, pp. 1 through 7.

* cited by examiner

220

220 (cont'd)

Receive Beacon Data of Each of A Plurality of Satellites 220-5

Extract A Satellite Identifier from Each Beacon Data 220-6

Using Each Extracted Identifier, Obtain Orbital Data for Each Satellite Whose Satellite Identifier Was Extracted 220-7

Obtain A Reference Time from The Orbital Data for Many Satellites 220-8

Determine A Difference Time 220-9

Based on A Radiation Pattern of Antennas of A Satellite Receiver and A Minimum Detectable Signal Threshold Level of the Satellite Receiver, Define A Bounded Area 220-10

Using The Difference Time and Obtained Orbital Data, Generate An Estimated PDF of Absolute Position of Each Satellite Whose Satellite Identifier Was Extracted 220-11

Using Each Estimated PDF of Absolute Position, Generating A Representation of PDFs of A Relative Position of Each Satellite Whose Satellite Identifier Was Extracted 220-12

Using Yet Another Current ACDT and Each Received Beacon Data, Determine (a) Angles of Arrival and (b) A Signal Strength of Each Beacon Signal within The Bounded Area 220-13

Using Each Determined Angles of Arrival and Each Signal Strength, Generate A Representation of Measured PDFs of Relative Position of Each Satellite Whose Identifier Was Extracted 220-14

Using Inertial Data, The Representation of The Measured PDFs, and The Representation of The Estimated PDFs, Determine An Estimated Position of A Body 220-15

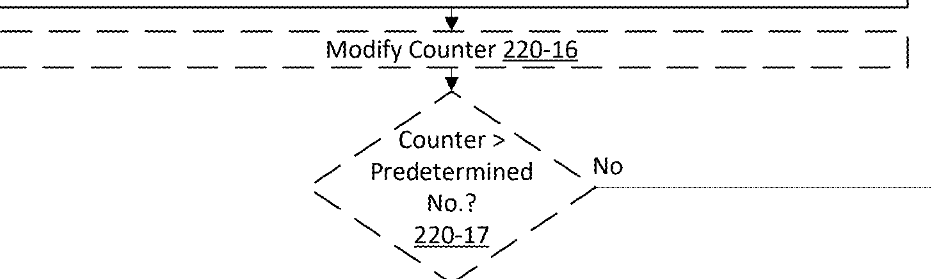

Determine Measured Entry Time and Measured Exit Time of Each Satellite, and A Gradient of Signal Strength of Each Satellite Signal overThe Bounded Area 220-18

For Each Satellite whose Identifier Was Extracted, Add The Entry Time, the Exit Time, and The Gradient of Signal Strength of A Satellite to A Representation of Measured PDFs of Relative Position of The Satellites 220-19

FIG. 2 (cont'd)

TECHNIQUES FOR USING SATELLITES TO AID IN GEOGRAPHICAL POSITION DETERMINATION

BACKGROUND

Spoofing and/or jamming of navigation aiding signals emitted from global navigation satellite systems (GNSSs) is becoming common place. In the event of such GNSS signal spoofing and/or jamming, navigation systems typically rely on inertial navigation. However, in the absence of accurate GNSS signals, navigation relying on inertial measurements is prone to error which increases over time.

SUMMARY

In some aspects, the techniques described herein relate to a method for determining a position of a body, the method including: counting an atomic clock derived time starting at a current global navigation satellite system (GNSS) time and incremented by a periodic time count from an atomic clock; attempting to receive a later current GNSS time occurring after the current GNSS time; determining whether the later current GNSS time is received and valid; determining that the later current GNSS time is at least one of not received and not valid, then providing an estimated geographical position of the body to a navigation system; receiving beacon data of each of a plurality of satellites, wherein the beacon data includes a unique satellite identifier of one of the plurality of satellites and a signal strength of a beacon signal including the unique satellite identifier; extracting a satellite identifier from each received beacon data; using each extracted satellite identifier and most recently received orbital data for many satellites, obtaining orbital data of each satellite whose satellite identifier was extracted; obtaining a reference time from the most recently received orbital data for many satellites; determining a difference time equal to an absolute value of a difference between another current atomic clock derived time and the reference time; based on a radiation pattern of an antenna array of a satellite receiver configured to receive each beacon signal and minimum detectable signal threshold level of the satellite receiver, defining a bounded area; using the difference time and an obtained orbital data, generating an estimated probability density function (PDF) of absolute geographical position of each satellite in the bounded area and whose satellite identifier was extracted; using each estimated PDF of absolute geographical position, generating a representation of estimated PDFs of relative geographical position of each satellite in the bounded area, wherein each such relative geographical position is relative to a most recently (a) estimated position of the body or (b) received valid GNSS position; using yet another current atomic clock derived time and received beacon data of each satellite whose satellite identifier was extracted, determining (a) angles of arrival of the beacon signal of each satellite, whose satellite identifier was extracted, with respect to the body, and (b) a signal strength of each beacon signal received from a satellite whose satellite identifier was extracted; using each determined angles of arrival, determining a representation of measured PDFs of relative geographical position for each satellite whose identifier was extracted; using inertial measurement unit (IMU) data, the representation of the measured PDFs of relative geographical position for each satellite, and the representation of estimated PDFs of relative geographical position of each satellite, determining the estimated geographical position of the body; determining a measured entry time and a measured exit time of each satellite, and a gradient, over the bounded area, of a strength of the beacon signal of each satellite whose identifier was extracted over the bounded area; and for each satellite whose identifier was extracted, adding the measured entry time, the measured exit time, and the gradient of a strength of the beacon signal of each satellite whose identifier was extracted to the representation of measured PDFs of relative position of each satellite.

In some aspects, the techniques described herein relate to a non-transitory computer readable medium storing a program causing at least one processor to execute a process to determine a position of a body, the process including: counting an atomic clock derived time starting at a current global navigation satellite system (GNSS) time and incremented by a periodic time count from an atomic clock; attempting to receive a later current GNSS time occurring after the current GNSS time; determining whether the later current GNSS time is received and valid; determining that the later current GNSS time is at least one of not received and not valid, then causing provision of an estimated geographical position of the body to a navigation system; receiving beacon data of each of a plurality of satellites, wherein the beacon data includes a unique satellite identifier of one of the plurality of satellites and a signal strength of a beacon signal including the unique satellite identifier; extracting a satellite identifier from each received beacon data; using each extracted satellite identifier and most recently received orbital data for many satellites, obtaining orbital data of each satellite whose satellite identifier was extracted; obtaining a reference time from the most recently received orbital data for many satellites; determining a difference time equal to an absolute value of a difference between another current atomic clock derived time and the reference time; based on a radiation pattern of an antenna array of a satellite receiver configured to receive each beacon signal and minimum detectable signal threshold level of the satellite receiver, defining a bounded area; using the difference time and an obtained orbital data, generating an estimated probability density function (PDF) of absolute geographical position of each satellite in the bounded area and whose satellite identifier was extracted; using each estimated PDF of absolute geographical position, generating a representation of estimated PDFs of relative geographical position of each satellite in the bounded area, wherein each such relative geographical position is relative to a most recently (a) estimated position of the body or (b) received valid GNSS position; using yet another current atomic clock derived time and received beacon data of each satellite whose satellite identifier was extracted, determining (a) angles of arrival of the beacon signal of each satellite, whose satellite identifier was extracted, with respect to the body, and (b) a signal strength of each beacon signal received from a satellite whose satellite identifier was extracted; using each determined angles of arrival, determining a representation of measured PDFs of relative geographical position for each satellite whose identifier was extracted; using inertial measurement unit (IMU) data, the representation of the measured PDFs of relative geographical position for each satellite, and the representation of estimated PDFs of relative geographical position of each satellite, determining the estimated geographical position of the body; determining a measured entry time and a measured exit time of each satellite, and a gradient, over the bounded area, of a strength of the beacon signal of each satellite whose identifier was extracted over the bounded area; and for each satellite whose identifier was extracted, adding the measured entry time, the measured exit time, and the gradient of a strength of the beacon signal of each satellite whose identifier was extracted to the representation of measured PDFs of relative position of each satellite.

In some aspects, the techniques described herein relate to an apparatus for determining a position of a body, the apparatus including: a satellite receiver on or in the body, wherein the satellite receiver includes an antenna array on or in the body; an atomic clock on or in the body and configured to provide a periodic time count; a global navigation satellite system (GNSS) receiver on or in the body; an inertial measurement unit on or in the body and including at least one of: at least one accelerometer and at least one gyroscope, a processing circuitry on or in the body and communicatively coupled to each of the satellite receiver, the atomic clock, the GNSS receiver, and the inertial measurement unit; wherein the processing circuitry is configured to: count an atomic clock derived time starting at a current GNSS time from the GNSS receiver and incremented by the periodic time count received from the atomic clock; attempt to receive a later current GNSS time occurring after the current GNSS time; determine whether the later current GNSS time is received and valid; determining that the later current GNSS time is at least one of not received and not valid, then use an estimated geographical position of the body to provide information about the position of the body with respect to an intended destination of the body; receive beacon data of each of a plurality of satellites, wherein the beacon data includes a unique satellite identifier of one of the plurality of satellites and a signal strength of a beacon signal including the unique satellite identifier; extract a satellite identifier from each received beacon data; using each extracted satellite identifier and most recently received orbital data for many satellites, obtain orbital data of each satellite whose satellite identifier was extracted; obtain a reference time from the most recently received orbital data for many satellites; determine a difference time equal to an absolute value of a difference between another current atomic clock derived time and the reference time; based on a radiation pattern of an antenna array of a satellite receiver configured to receive each beacon signal and minimum detectable signal threshold level of the satellite receiver, define a bounded area; using the difference time and an obtained orbital data, generate an estimated probability density function (PDF) of absolute geographical position of each satellite in the bounded area and whose satellite identifier was extracted; using each estimated PDF of absolute geographical position, generate a representation of estimated PDFs of relative geographical position of each satellite in the bounded area, wherein each such relative geographical position is relative to a most recently (a) estimated position of the body or (b) received valid GNSS position; using yet another current atomic clock derived time and received beacon data of each satellite whose satellite identifier was extracted, determine (a) angles of arrival of the beacon signal of each satellite, whose satellite identifier was extracted, with respect to the body, and (b) a signal strength of each beacon signal received from a satellite whose satellite identifier was extracted; using each determined angles of arrival, determine a representation of measured PDFs of relative geographical position for each satellite whose identifier was extracted; using inertial measurement unit (IMU) data, the representation of the measured PDFs of relative geographical position for each satellite, and the representation of estimated PDFs of relative geographical position of each satellite, determine the estimated geographical position of the body; determine a measured entry time and a measured exit time of each satellite, and a gradient, over the bounded area, of a strength of the beacon signal of each satellite whose identifier was extracted over the bounded area; and for each satellite whose identifier was extracted, adding the measured entry time, the measured exit time, and the gradient of a strength of the beacon signal of each satellite whose identifier was extracted to the representation of measured PDFs of relative position of each satellite.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

Figure 1A:
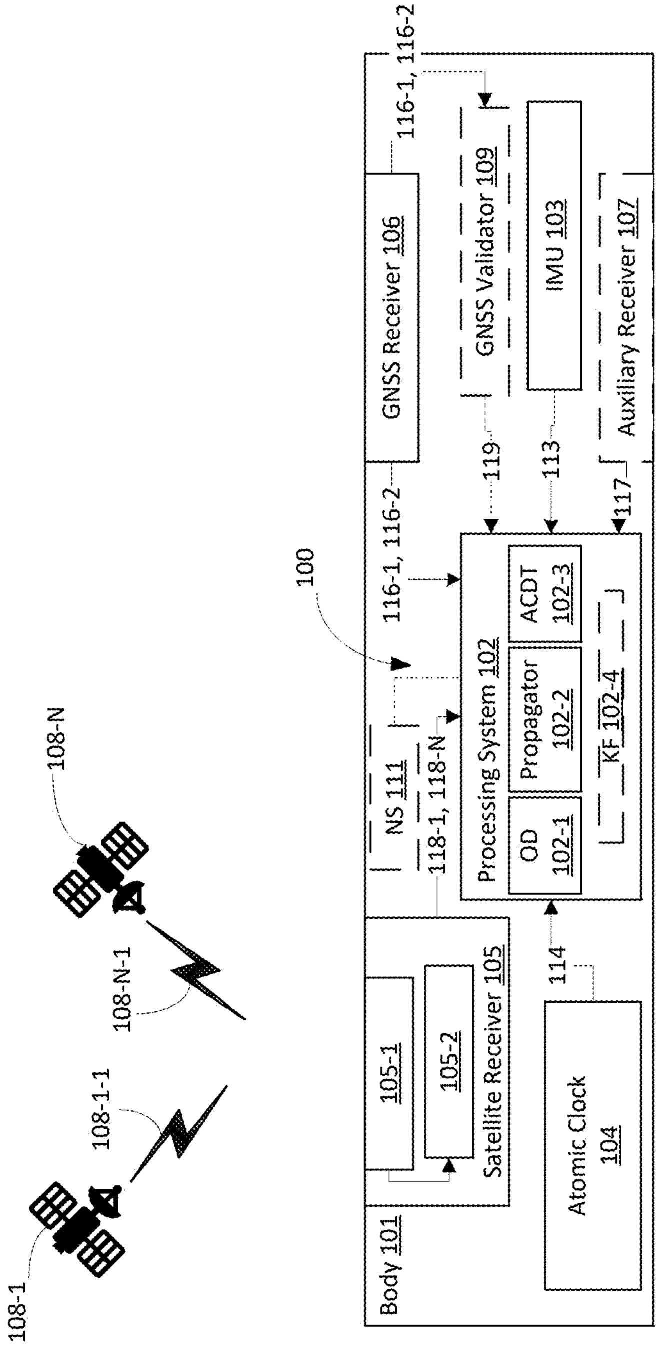
FIG. 1A illustrates a block diagram of one embodiment of a geographical position determination system according to embodiments of the invention and which is configured to be mounted on or in a body.

In the following detailed description, reference is made to the accompanying drawings that form a part hereof, and in which is shown by way of illustration specific illustrative embodiments. However, it is to be understood that other embodiments may be utilized and that structural, mechanical, and/or electrical changes may be made. Furthermore, each method presented in the drawing figures and the specification is not to be construed as limiting the order in which the individual steps may be performed. The following detailed description is not to be taken in a limiting sense.

Embodiments of the invention are techniques using representation(s) of the measured probability density functions (PDFs), representation(s) of estimated PDFs, and inertial measurement data, to determine geographical position of a body with increased accuracy. Some of such PDF(s) are determined using data about one or more satellites and atomic clock derived time. Atomic clock derived time starts at a GNSS time (deemed accurate and obtained from a GNSS receiver) and is incremented with atomic clock generated time increments.

Optionally, the body may be a vehicle, a human being, an animal, or any other type of body. Optionally, the vehicle may be an aircraft, a terrestrial vehicle, a seaborne vehicle, a submersible vehicle, or any other type of vehicle.

FIG. 1A illustrates a block diagram of one embodiment of a geographical position determination system 100 according to embodiments of the invention and which is configured to be mounted on or in a body 101. The geographical position determination system (or geographical position determination circuitry) 100 includes a processing system (or processing circuitry) 102, an inertial management unit 103, an atomic clock 104, a GNSS receiver 106, and a satellite receiver 105. The atomic clock 104 provides periodic time count data 114, e.g., a periodic electrical signal. Optionally, the geographical position determination system 100 further includes an auxiliary receiver 107 configured to receive orbital data for many satellites 117 from a source external, e.g., controlled by a governmental entity, to the body 101.

An optional navigation system (NS) 111 is communicatively coupled to or part of the geographical position determination system 100, e.g., the processing system 102. For pedagogical purposes, the optional navigation system 111 is shown as being separate from the processing system 102. The optional navigation system 111 is configured to receive state variable data, e.g., position about the body, from the GNSS receiver 106 or determined, e.g., according to the methods described herein using satellite data. Optionally, the navigation system is configured to receive (a) GNSS state variable data and optionally GNSS time or (b) an estimated position of the body and optionally atomic clock derived time. The optional navigation system 111 is used to provide information about the geographical location of the body with respect to its surroundings, e.g., a desired arrival location. Optionally, the optional navigation system 111 may be used to control the body, e.g., an autopilot system, to arrive at the desired arrival location.

Optionally, the geographical position determination system 100 is configured to at least one of:

(a) include a GNSS signal validator (or GNSS validator or GNSS signal validator circuit) 109 configured to generate a GNSS validation signal 119 provided to the processing system 102 which indicates whether current GNSS time 116-1 and/or GNSS state variable data 116-2 (received with the current GNSS time) are valid, e.g., has been received and is deemed to be accurate. Optionally, GNSS time validity is determined by ascertaining whether the current GNSS time 116-1 is within a predetermined time window around an expected time, e.g., an atomic clock derived time 102-3. Optionally, GNSS state variable data 116-2 (received with the current GNSS time) validity is determined by ascertaining whether at least one variable, e.g., longitude, latitude, altitude, and vector velocity component, of such GNSS state variable data is not within a corresponding predetermined variable window around an expected variable value, e.g., derived by the processing system 102, for example the Kalman filter 102-4; and (b) receive such a GNSS validation signal 119 from an external GNSS signal validator.

Thus, the GNSS validation signal 119 may indicate either (x) that the current GNSS time 116-1 and the GNSS state variable data 116-2 were received and are valid, and thus can be relied upon, or (y) that at least one of the current GNSS time 116-1 and the GNSS state variable data 116-2 were not received, e.g. due to GNSS jamming and/or spoofing, and thus cannot be relied upon. Optional, if the GNSS validation signal 119 indicated that the current GNSS time 116-1 and/or the GNSS state variable data 116-2 were not received or are invalid, then then time and body position are determined utilizing information about satellites as described elsewhere herein.

The GNSS receiver 106 includes at least one GNSS receiver antenna. The GNSS receiver 106 is configured to receive signals from a GNSS from which state variables, e.g., geographical position and/or vector velocity, of the body 101 and time can be obtained. A GNSS may be Global Positioning System (GPS), Galileo, Globalnaya Navigazionnaya Sputnikovaya Sistema (GLONASS), BeiDou Navigation Satellite System (BDS), or any other GNSS.

Optionally, when the orbital data for many satellites 117 is only accurate for a limited number of time epoch(s), the orbital data for many satellites 117 is received periodically or aperiodically, e.g., daily, and stored in the processing system 102, e.g., memory circuitry therein. Thus, the processing system 102 is further configured to receive the orbital data for many satellites 117 from the auxiliary receiver 107. Such orbital data for many satellites 117 is any data in any format which describes time dependent position and movement of a satellite, e.g., for one or more time epochs commencing with a start time provided in the orbital data. Optionally, the orbital data for many satellites 117 may be ephemeris data, or may be in a two or three line element set format, orbit mean elements format, or any other format. Optionally, the orbital data for many satellites 117 includes Keplerian data.

The satellite receiver 105 includes at least one receiver channel 105-2 and an antenna array 105-1 including at least two antennas, e.g., three or more antennas. Each antenna of the antenna array 105-1 may be located at different locations on the body 101, e.g., on an exterior of the body 101.

Each receiver channel is configured to down convert and demodulate electromagnetic signals, e.g., a beacon from a satellite. Each receiver channel may have a physical or non-physical embodiment. Optionally, the satellite receiver 105 includes an equal number of receiver channels and antennas, wherein each receiver channel is configured to receive electromagnetic energy, e.g., from a satellite beacon, through a unique antenna. Optionally, the satellite receiver 105 includes least three antennas each of which is configured to provide such electromagnetic energy to a unique one of at least three receiver channels. Optionally, the satellite receiver 105 is a software defined radio (SDR).

The satellite receiver 105, and each receiver channel thereof, is configured to receive a beacon 108-1-1, 108-N−1 emitted by each of N satellites 108-1, 108-N and which is detectable by the satellite receiver 105, e.g. one or more receiver channels thereof. Each beacon signal 108-1-1, 108-N−1 includes a unique satellite identifier (ID) corresponding to the satellite emitting the beacon signal. Optionally, one or more of the N satellites 108-1, 108-N is a low earth orbit (LEO) satellite. N is an integer greater than zero, e.g., greater than one, two, or three. The satellite receiver 105, e.g., each receiver channel, is further configured to provide beacon data 118-1, 118-N extracted from a beacon signal 108-1-1, 108-1-N emitted by each of the N satellites 108-1, 108-N. The beacon data 118-1, 118-N includes a satellite identifier uniquely corresponding to the satellite 108-1, 108-N which transmitted the beacon signal. Optionally, the beacon data 118-1, 118-N includes a signal strength of a beacon signal received by the satellite receiver, e.g., each receiver channel thereof.

Optionally, each of the antennas of the antenna array 105-1 may be co-located on the body 101. Each antenna is electromagnetically coupled to a unique receiver channel, the beacon data of one satellite will be provided by each receiver channel will be provided to the processing system 102 at a different time. Optionally, a time difference of arrival of a beacon signal of a satellite between antennas of the antenna array 105-1, and thus a time difference of arrival of beacon data of the satellite at the processing system from each receiver channel, may be used to determine an angle of arrival at which a beacon signal is received by the satellite receiver 105, e.g., the antenna array 105-1 thereof. Angle of arrival may be determined, however, in alternative ways.

The processing system 102 includes most recently received orbital data from many satellites (OD) 102-1, a propagator 102-2, and atomic clock derived time (ACDT) 102-3. Optionally, the processing system 102 includes a Kalman filter 102-4 which is an algorithm which may be optionally implemented in software and is described further elsewhere herein.

Optionally, the most recently received orbital data for many satellites 102-1 is received, e.g., periodically or aperiodically, from the auxiliary receiver 107. The atomic clock derived time 102-3, as described elsewhere herein, is used when accurate GNSS time is no longer provided by the GNSS receiver 106 and/or received by the processing system 102.

Using the atomic clock derived time 102-3 and orbital data of a satellite obtained from the most recently received orbital data for many satellites 102-1, the propagator 102-2 is configured to estimate a geographical position of the satellite at or about the atomic clock derived time 102-3. Optionally, the propagator 102-2 is a software algorithm, for example, the simplified general perturbation four (SGP4) model.

The processing system 102 is further configured to generate an estimated time (ET) 102-3, described elsewhere herein, when the processing system 102 uses when an accurate GNSS time is no longer provided by the GNSS receiver and/or received by the processing system 102.

Figure 1B:
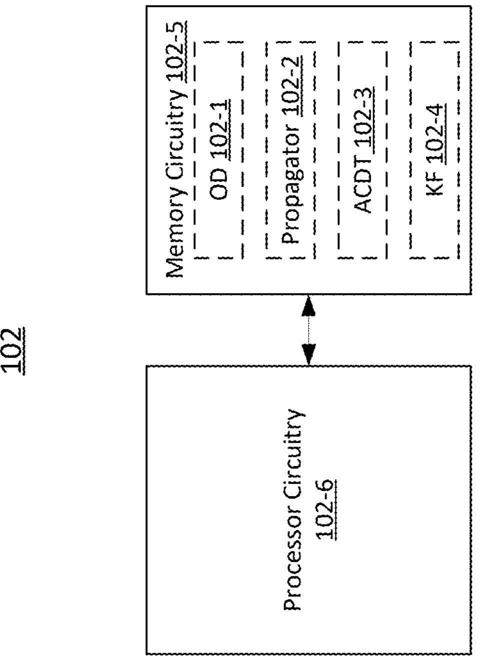
FIG. 1B illustrates a block diagram of one embodiment of a processing system.

FIG. 1B illustrates a block diagram of one embodiment of a processing system 102. The processing system 102 illustrated in FIG. 1B includes processor circuitry 102-6 electrically coupled to memory circuitry 102-5. Optionally, the most recently received orbital data for many satellites 102-1, the propagator 102-2, the atomic clock derived time 102-3, and the optional Kalman filter 102-4 may each be stored in the memory circuitry 102-5.

Returning to FIG. 1A, the processing system 102 is electrically coupled to the IMU 103, the atomic clock 104, the satellite receiver 105, and the GNSS receiver 106. Optionally, processing system 102 is electronically coupled to the auxiliary receiver 107.

The processing system 102 is configured to receive inertial measurement data 113 from the IMU 103, periodic time count data 114 from the atomic clock 104, and N sets of beacon data 118-1, 118-N from the satellite receiver 105. The processing system 102 is further configured to receive, from the GNSS receiver 106, GNSS time 116-1 and optionally GNSS state variable data 116-2, e.g., geographical position and/or vector velocity of the body 101.

The processing system 102 is configured to use GNSS time 116-1, the inertial measurement data 113, the atomic clock derived time 102-3, signal strength of each beacon data, each satellite identifier, and the most recently received orbital data for many satellites 102-1 to determine a geographical position of the body 101. Optionally, the processing system 102 is configured to determine a geographical position of the body 101 by performing an embodiment of a method illustrated in FIG. 2.

Figure 2:
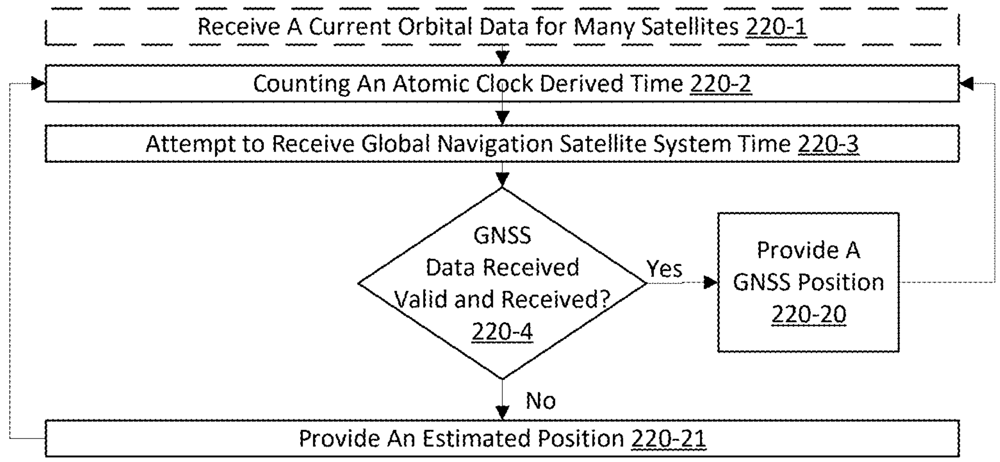
FIG. 2 illustrates a flow diagram of one embodiment of a method for determining a geographical position of a body with increased accuracy using inertial measurement data, data about satellites, and atomic clock derived time.

FIG. 2 illustrates a flow diagram of one embodiment of a method 220 for determining a geographical position of a body with increased accuracy using inertial measurement data, data about satellites, and atomic clock derived time. Embodiments of method 220 illustrated herein may be implemented with the apparatuses illustrated and described with respect to FIGS. 1A and 1B, but may be implemented in other ways as well. Optionally, method 220 is configured to be executed by the processing system 102.

The blocks of the flow diagrams have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

In optional block 220-1, orbital data for many satellites is received, e.g., periodically or aperiodically. Optionally, the orbital data may be received in a manner and from a source as described elsewhere herein. Optionally, such orbital data for many satellites becomes the most recently received orbital data for many satellites, and, e.g., is stored in the processing system or the memory circuitry therein. The orbital data for many satellites includes a reference time, e.g., identifying a commencement time for the time epoch(s) for the orbital data for many satellites is accurate. Orbital data for many satellites is further described elsewhere herein.

In block 220-2, counting an atomic clock derived time starting at the current GNSS time and incremented by periodic time count data, e.g., provided by an atomic clock. The current GNSS time used to determine the atomic clock derived time is deemed to be accurate, e.g., and is obtained in a region where there is neither GNSS jamming nor spoofing. Optionally, the current GNSS time is received with the GNSS receiver from a GNSS.

In block 220-3, later current GNSS time is attempted to be received, e.g., with the GNSS receiver from a GNSS. Corresponding state variable GNSS data may be contemporaneously received with the later current GNSS time. The later current GNSS time occurs and is received after the current GNSS time of block 220-2.

In block 220-4, whether the later current GNSS time and/or corresponding GNSS state variable data (collectively "GNSS data") is valid and received in an expected time window. Valid means that the later current time is received in a predetermined time window about an atomic clock derived time when the later current GNSS time is expected and/or is associated with GNSS state variable data, contemporaneously provided with the other current GNSS time, which is determined to be valid, e.g., by a GNSS validator and/or by determining whether a difference between values of GNSS (provided) position of the body and an estimated position of the body derived in block 220-15 of FIG. 2 herein exceeds a predetermined threshold value.

Optionally, if the later current GNSS time and/or GNSS state variable data is determined to valid and received, then, in block 220-20, at the GNSS state variables, e.g., GNSS (provided) position and optionally GNSS (provided) time, is provided to a navigation system. After block 220-20, then proceed to block 220-2, where counting the atomic clock derived time starts at the other current GNSS time and incremented by periodic time count data GNSS time is set to the other GNSS time.

If the later GNSS time and/or the GNSS state variable data is determined to not have been received or not to be accurate, then, in block 220-21, the estimated position of the body (e.g., determined in block 220-15) and optionally atomic clock derived time is provided, for example to the navigation system.

in block 220-5 beacon data is received (e.g., from a satellite receiver—for example from one or more receiver channels thereof) of each of a plurality of satellites. Each beacon data of a beacon signal includes a unique satellite identifier corresponding to a satellite which is emitted the beacon signal. The beacon data and beacon signal are further discussed elsewhere herein.

In block 220-6, a satellite identifier is extracted from each received beacon data. In block 220-7, using each extracted satellite identifier, orbital data of each satellite whose satellite identifier was extracted is obtained; such orbital data may be referred to as obtained orbital data. Optionally, the obtained orbital data is obtained from the most recently received orbital data for many satellites, e.g., stored in the processing system or the memory circuitry therein.

In block 220-8, a reference time is obtained from the most recently received orbital data for many satellites, e.g., stored in the processing circuitry or the memory circuitry therein. The reference time is further described elsewhere herein.

In block 220-9, a difference time is determined and is equal to an absolute value of a difference between another current atomic clock derived time and the reference time from the most recently received orbital data for many satellites. The difference time may be calculated different way. For example, the difference time may be determined exactly as described above or alternatively by determining an absolute value of a difference between the GNSS time and the reference time, and adding periodic time count data counted substantially at a time when such difference time is determined. Optionally, the other current atomic clock derived time is the atomic clock derived time substantially at a time when a corresponding block is being performed.

In block 220-10, based on a radiation pattern of antennas of the satellite receiver and a minimum detectable signal threshold level of the satellite receiver, a bounded area is generated.

In block 220-11, using the difference time and the obtained orbital data, an estimated probability density function (PDF) of absolute geographical position (of each satellite in the bounded area and whose satellite identifier was extracted) is generated, e.g., using the propagator. Optionally, when a representation of a measured PDF of relative position of a satellite includes a measured entry time and/or a measured exit time, then the estimated PDF of relative geographical position of the satellite includes respectively an estimated entry time and/or an estimate exit time. Optionally, when a representation of measured PDFs of relative position of a satellite includes a gradient of signal strength of a beacon of a satellite, then the estimated PDF of relative geographical position of the satellite includes a gradient of estimated distance between the body and the satellite.

A PDF includes a measure of central tendency, e.g., a mean, median, or mode, and a measure of variability, e.g., a variance, standard deviation, or a range around the measure of central tendency. Optionally, the estimated PDF of absolute geographical position may be determined using the propagator described elsewhere herein. The estimated PDF of absolute geographical position of each satellite characterizes absolute geographical position error of the satellites each of whose satellite identifier was extracted; error data used to calculate such absolute geographical position error is provided by the obtained orbital data and/or the optional propagator. Optionally, such estimated PDF of absolute geographical position is at the current atomic clock derived time.

In block 220-12, using each estimated PDF of absolute geographical position, a representation, e.g., a mathematical matrix, of estimated PDFs of a relative geographical position of each satellite in the bounded area, whose satellite identifier was extracted, is generated. Optionally, this entails both:

(i) converting each estimated PDF of absolute geographical position of a satellite whose satellite identifier was extracted to an estimated PDF of relative geographical position of the satellite; and (ii) forming the representation of the estimated PDFs of relative geographical position.

Element (i) may be performed before element (ii) or at the same time as element (ii).

Each relative geographical position is relative with respect to a most recent geographical position of the body. The most recent geographical position of the body may be the most recently determined or received of either an estimated geographical position of the body determined by method 220, e.g., in block 220-15, or provided by the GNSS receiver (and deemed valid as described elsewhere herein). The most recent geographical position of the body is utilized to translate the estimated PDF of absolute geographical position to the estimated PDF of relative geographical position. The measure of variability of the estimated PDF of relative geographical position accounts for the measure of variability of the absolute geographical position and the measure of variability of the estimated location of the body. Optionally, the measure of central tendency of the estimated PDF of relative geographical position is in radial and azimuthal planes centered around the estimated position of the body.

In block 220-13, using yet another current atomic clock derived time (ACDT) and received beacon data of each satellite whose satellite identifier was extracted, (a) angles of arrival of a beacon signal of each satellite, whose satellite identifier was extracted, with respect to the body, e.g., the satellite receiver or the satellite receiver antennas and (b) a signal strength of each beacon signal received from a satellite whose satellite identifier was extracted—are determined. Angles of arrival are in radial and azimuthal planes centered around the body, e.g., the satellite receiver or the satellite receiver antennas. As discussed elsewhere herein, signal strength may be included in beacon data, and thus extracted therefrom. The angles of arrival are with respect to the antenna array of the satellite receiver. Optionally, each angle of arrival is calculated with respect to a unique antenna of the antenna array.

In block 220-14, using each determined angles of arrival, a representation, e.g., a mathematical matrix, of measured PDFs of relative geographical position is determined for each satellite whose identifier was extracted. Each determined signal strength optionally may also be used to determine the representation of measured PDFs of relative geographical position. Such measured PDFs of relative geographical position are determined using well known angle of arrival equation(s) to determine phase differences between each antenna of the antenna array. Each relative geographical position is relative with respect to a previously determined position, e.g., a most recently (a) estimated position of the body from block 220-15 or (b) received valid GNSS position.

In block 220-15, using inertial measurement data, e.g., from the IMU, each representation of the measured PDFs, and each representation of estimated PDFs, an estimated geographical position of the body is determined. Optionally, such geographical position may be determined using a Kalman filter, e.g., executed by the processing system 102, which uses a state equation whose state parameters include the inertial measurement data, the representation(s) of the measured PDFs, and the representation(s) of estimated PDFs.

Blocks 220-2 through 220-15 or blocks 220-5 through 220-15 are performed for a time interval or period. The representations of PDFs determined in blocks 220-12 and 220-14 are valid during the time interval in which they are determined.

In optional block 220-16, modify a counter. In optional block 220-17, whether the counter passes a predetermined threshold value is determined. Passing the predetermined threshold value means that the counter is only one of: greater than or less than the predetermined threshold value. Optionally, the predetermined threshold value may be a number that is equal to or greater than two. If the counter has not passed the predetermined threshold value, then proceed to block 220-5.

If the counter has passed the predetermined threshold value, then in block 220-18, a measured entry time into the bounded area, a measured exit time out of the bounded area, and a gradient of a strength of a beacon of a satellite over the bounded area are determined for each satellite whose identifier was extracted. The measured entry and exit times are determined when a satellite signal is respectively first detected and last detected, e.g., by the satellite receiver. In block 220-19, for each satellite whose identifier was extracted, the entry time, the exit time, and the gradient of beacon strength of each satellite is added to a representation of the measured PDF of relative position of the satellites. After block 220-19, then proceed to block 220-5.

The processor circuitry described herein may include one or more microprocessors, microcontrollers, digital signal processing (DSP) elements, application-specific integrated circuits (ASICs), and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuitry described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium that is part of (optionally the memory circuitry) or communicatively coupled to the processing circuitry, and executed by the processing circuitry, optionally the processor circuitry. Generally, program modules or applications include routines, programs, objects, data components, data structures, algorithms, and the like, which perform particular tasks or implement particular abstract data types.

While the present teachings have been illustrated with respect to one or more implementations, alterations and/or modifications can be made to the illustrated examples without departing from the scope of the appended claims. In addition, while a particular feature of the present disclosure may have been described with respect to only one of several implementations, such feature may be combined with one or more other features of the other implementations as may be desired and advantageous for any given or particular function. Furthermore, to the extent that the terms “including,” “includes,” “having,” “has,” “with,” or variants thereof are used in either the detailed description and/or the claims, such terms are intended to be inclusive in a manner similar to the term “comprising.” The term “at least one of” is used to mean one or more of the listed items can be selected. As used herein, the term “one or more of” with respect to a listing of items such as, for example, A and B or A and/or B, means A alone, B alone, or A and B. The term “at least one of” is used to mean one or more of the listed items can be selected.

Terms of relative position as used in this application are defined based on a plane parallel to the conventional plane or working surface of a material (e.g., a layer or a substrate), regardless of orientation. Terms such as “on,” “higher,” “lower,” “over,” “top,” and “under” are defined with respect to the conventional plane or working surface being on the top surface of a layer or substrate, regardless of orientation. The terms “about” or “substantially” indicate that the value or parameter specified may be somewhat altered, as long as the alteration does not result in nonconformance of the process or structure to the illustrated embodiment. Finally, “exemplary” indicates the description is used as an example, rather than implying that it is an ideal. Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Example Embodiments

Example 1 includes a method for determining a position of a body, the method comprising: counting an atomic clock derived time starting at a current global navigation satellite system (GNSS) time and incremented by a periodic time count from an atomic clock; attempting to receive a later current GNSS time occurring after the current GNSS time; determining whether the later current GNSS time is received and valid; determining that the later current GNSS time is at least one of not received and not valid, then providing an estimated geographical position of the body to a navigation system; receiving beacon data of each of a plurality of satellites, wherein the beacon data comprises a unique satellite identifier of one of the plurality of satellites and a signal strength of a beacon signal including the unique satellite identifier; extracting a satellite identifier from each received beacon data; using each extracted satellite identifier and most recently received orbital data for many satellites, obtaining orbital data of each satellite whose satellite identifier was extracted; obtaining a reference time from the most recently received orbital data for many satellites; determining a difference time equal to an absolute value of a difference between another current atomic clock derived time and the reference time; based on a radiation pattern of an antenna array of a satellite receiver configured to receive each beacon signal and minimum detectable signal threshold level of the satellite receiver, defining a bounded area; using the difference time and an obtained orbital data, generating an estimated probability density function (PDF) of absolute geographical position of each satellite in the bounded area and whose satellite identifier was extracted; using each estimated PDF of absolute geographical position, generating a representation of estimated PDFs of relative geographical position of each satellite in the bounded area, wherein each such relative geographical position is relative to a most recently (a) estimated position of the body or (b) received valid GNSS position; using yet another current atomic clock derived time and received beacon data of each satellite whose satellite identifier was extracted, determining (a) angles of arrival of the beacon signal of each satellite, whose satellite identifier was extracted, with respect to the body, and (b) a signal strength of each beacon signal received from a satellite whose satellite identifier was extracted; using each determined angles of arrival, determining a representation of measured PDFs of relative geographical position for each satellite whose identifier was extracted; using inertial measurement unit (IMU) data, the representation of the measured PDFs of relative geographical position for each satellite, and the representation of estimated PDFs of relative geographical position of each satellite, determining the estimated geographical position of the body; determining a measured entry time and a measured exit time of each satellite, and a gradient, over the bounded area, of a strength of the beacon signal of each satellite whose identifier was extracted over the bounded area; and for each satellite whose identifier was extracted, adding the measured entry time, the measured exit time, and the gradient of a strength of the beacon signal of each satellite whose identifier was extracted to the representation of measured PDFs of relative position of each satellite.

Example 2 includes the method of Example 1, further comprising receiving the orbital data for many satellites.

Example 3 includes the method of any of Examples 1-2, wherein determining that the GNSS time is valid comprises determining that whether a difference between a GNSS provided geographical position of the body and the estimated geographical position of the body exceeds a predetermined threshold value.

Example 4 includes the method of any of Examples 1-3, wherein at least one of: (a) the estimated PDF of relative geographical position of a satellite whose identifier was extracted comprises an estimated entry time of the satellite into the bounded area when the representation of a measured PDF of relative position of the satellite comprises the measured entry time of the satellite into the bounded area; (b) the estimated PDF of relative geographical position of a satellite whose identifier was extracted comprises an estimated exit time of the satellite out of the bounded area when the representation of the measured PDF of relative position of the satellite comprises the measured exit time of the satellite out of the bounded area; and (c) the estimated PDF of relative geographical position of a satellite whose identifier was extracted comprises a gradient of an estimated distance between the body and the satellite when the representation of the measured PDF of relative position of the satellite comprises the gradient, in the bounded area, of the signal strength of a beacon of the satellite.

Example 5 includes the method of any of Examples 1-4, wherein the beacon data is received from each of at least three receiver channels, of the satellite receiver, each of which is electromagnetically coupled to a unique antenna of the antenna array.

Example 6 includes the method of any of Examples 1-5, wherein determining whether the later current GNSS time is valid is determined by a validator.

Example 7 includes a non-transitory computer readable medium storing a program causing at least one processor to execute a process to determine a position of a body, the process comprising: counting an atomic clock derived time starting at a current global navigation satellite system (GNSS) time and incremented by a periodic time count from an atomic clock; attempting to receive a later current GNSS time occurring after the current GNSS time; determining whether the later current GNSS time is received and valid; determining that the later current GNSS time is at least one of not received and not valid, then causing provision of an estimated geographical position of the body to a navigation system; receiving beacon data of each of a plurality of satellites, wherein the beacon data comprises a unique satellite identifier of one of the plurality of satellites and a signal strength of a beacon signal including the unique satellite identifier; extracting a satellite identifier from each received beacon data; using each extracted satellite identifier and most recently received orbital data for many satellites, obtaining orbital data of each satellite whose satellite identifier was extracted; obtaining a reference time from the most recently received orbital data for many satellites; determining a difference time equal to an absolute value of a difference between another current atomic clock derived time and the reference time; based on a radiation pattern of an antenna array of a satellite receiver configured to receive each beacon signal and minimum detectable signal threshold level of the satellite receiver, defining a bounded area; using the difference time and an obtained orbital data, generating an estimated probability density function (PDF) of absolute geographical position of each satellite in the bounded area and whose satellite identifier was extracted; using each estimated PDF of absolute geographical position, generating a representation of estimated PDFs of relative geographical position of each satellite in the bounded area, wherein each such relative geographical position is relative to a most recently (a) estimated position of the body or (b) received valid GNSS position; using yet another current atomic clock derived time and received beacon data of each satellite whose satellite identifier was extracted, determining (a) angles of arrival of the beacon signal of each satellite, whose satellite identifier was extracted, with respect to the body, and (b) a signal strength of each beacon signal received from a satellite whose satellite identifier was extracted; using each determined angles of arrival, determining a representation of measured PDFs of relative geographical position for each satellite whose identifier was extracted; using inertial measurement unit (IMU) data, the representation of the measured PDFs of relative geographical position for each satellite, and the representation of estimated PDFs of relative geographical position of each satellite, determining the estimated geographical position of the body; determining a measured entry time and a measured exit time of each satellite, and a gradient, over the bounded area, of a strength of the beacon signal of each satellite whose identifier was extracted over the bounded area; and for each satellite whose identifier was extracted, adding the measured entry time, the measured exit time, and the gradient of a strength of the beacon signal of each satellite whose identifier was extracted to the representation of measured PDFs of relative position of each satellite.

Example 8 includes the non-transitory computer readable medium of Example 7, wherein the process further comprises receiving the orbital data for many satellites.

Example 9 includes the non-transitory computer readable medium of any of Examples 7-8, wherein determining that the GNSS time is valid comprises determining that whether a difference between a GNSS provided geographical position of the body and the estimated geographical position of the body exceeds a predetermined threshold value.

Example 10 includes the non-transitory computer readable medium of any of Examples 7-9, wherein at least one of: (a) the estimated PDF of relative geographical position of a satellite whose identifier was extracted comprises an estimated entry time of the satellite into the bounded area when the representation of a measured PDF of relative position of the satellite comprises the measured entry time of the satellite into the bounded area; (b) the estimated PDF of relative geographical position of a satellite whose identifier was extracted comprises an estimated exit time of the satellite out of the bounded area when the representation of the measured PDF of relative position of the satellite comprises the measured exit time of the satellite out of the bounded area; and (c) the estimated PDF of relative geographical position of a satellite whose identifier was extracted comprises a gradient of an estimated distance between the body and the satellite when the representation of the measured PDF of relative position of the satellite comprises the gradient, in the bounded area, of the signal strength of a beacon of the satellite.

Example 11 includes the non-transitory computer readable medium of any of Examples 7-10, wherein the beacon data is received from each of at least three receiver channels, of the satellite receiver, each of which is electromagnetically coupled to a unique antenna of the antenna array.

Example 12 includes the non-transitory computer readable medium of any of Examples 7-11, wherein determining whether the later current GNSS time is valid is determined by a validator.

Example 13 includes an apparatus for determining a position of a body, the apparatus comprising: a satellite receiver on or in the body, wherein the satellite receiver comprises an antenna array on or in the body; an atomic clock on or in the body and configured to provide a periodic time count; a global navigation satellite system (GNSS) receiver on or in the body; an inertial measurement unit on or in the body and comprising at least one of: at least one accelerometer and at least one gyroscope, a processing circuitry on or in the body and communicatively coupled to each of the satellite receiver, the atomic clock, the GNSS receiver, and the inertial measurement unit; wherein the processing circuitry is configured to: count an atomic clock derived time starting at a current GNSS time from the GNSS receiver and incremented by the periodic time count received from the atomic clock; attempt to receive a later current GNSS time occurring after the current GNSS time; determine whether the later current GNSS time is received and valid; determining that the later current GNSS time is at least one of not received and not valid, then use an estimated geographical position of the body to provide information about the position of the body with respect to an intended destination of the body; receive beacon data of each of a plurality of satellites, wherein the beacon data comprises a unique satellite identifier of one of the plurality of satellites and a signal strength of a beacon signal including the unique satellite identifier; extract a satellite identifier from each received beacon data; using each extracted satellite identifier and most recently received orbital data for many satellites, obtain orbital data of each satellite whose satellite identifier was extracted; obtain a reference time from the most recently received orbital data for many satellites; determine a difference time equal to an absolute value of a difference between another current atomic clock derived time and the reference time; based on a radiation pattern of an antenna array of a satellite receiver configured to receive each beacon signal and minimum detectable signal threshold level of the satellite receiver, define a bounded area; using the difference time and an obtained orbital data, generate an estimated probability density function (PDF) of absolute geographical position of each satellite in the bounded area and whose satellite identifier was extracted; using each estimated PDF of absolute geographical position, generate a representation of estimated PDFs of relative geographical position of each satellite in the bounded area, wherein each such relative geographical position is relative to a most recently (a) estimated position of the body or (b) received valid GNSS position; using yet another current atomic clock derived time and received beacon data of each satellite whose satellite identifier was extracted, determine (a) angles of arrival of the beacon signal of each satellite, whose satellite identifier was extracted, with respect to the body, and (b) a signal strength of each beacon signal received from a satellite whose satellite identifier was extracted; using each determined angles of arrival, determine a representation of measured PDFs of relative geographical position for each satellite whose identifier was extracted; using inertial measurement unit (IMU) data, the representation of the measured PDFs of relative geographical position for each satellite, and the representation of estimated PDFs of relative geographical position of each satellite, determine the estimated geographical position of the body; determine a measured entry time and a measured exit time of each satellite, and a gradient, over the bounded area, of a strength of the beacon signal of each satellite whose identifier was extracted over the bounded area; and for each satellite whose identifier was extracted, adding the measured entry time, the measured exit time, and the gradient of a strength of the beacon signal of each satellite whose identifier was extracted to the representation of measured PDFs of relative position of each satellite.

Example 14 includes the apparatus of Example 13, further comprising an auxiliary receiver communicatively coupled to the processing circuitry and configured to receive the orbital data for many satellites and to provide the orbital data for many satellites to the processing circuitry.

Example 15 includes the apparatus of any of Examples 13-14, wherein determining that the GNSS time is valid comprises determining that whether a difference between a GNSS provided geographical position of the body and the estimated geographical position of the body exceeds a predetermined threshold value.

Example 16 includes the apparatus of any of Examples 13-15, wherein at least one of: (a) the estimated PDF of relative geographical position of a satellite whose identifier was extracted comprises an estimated entry time of the satellite into the bounded area when the representation of a measured PDF of relative position of the satellite comprises the measured entry time of the satellite into the bounded area; (b) the estimated PDF of relative geographical position of a satellite whose identifier was extracted comprises an estimated exit time of the satellite out of the bounded area when the representation of the measured PDF of relative position of the satellite comprises the measured exit time of the satellite out of the bounded area; and (c) the estimated PDF of relative geographical position of a satellite whose identifier was extracted comprises a gradient of an estimated distance between the body and the satellite when the representation of the measured PDF of relative position of the satellite comprises the gradient, in the bounded area, of the signal strength of a beacon of the satellite.

Example 17 includes the apparatus of any of Examples 13-16, wherein the beacon data is received from each of at least three receiver channels, of the satellite receiver, each of which is electromagnetically coupled to a unique antenna of the antenna array.

Example 18 includes the apparatus of any of Examples 13-17, further comprising GNSS validator circuitry communicatively coupled to the processing circuitry and configured to determine whether the later current GNSS time is valid and communicate validity determination to the processing circuitry.

Example 19 includes the apparatus of any of Examples 13-18, wherein the processing circuitry comprises a Kalman filter and configured to determine the estimated geographical position of the body.

Example 20 includes the apparatus of any of Examples 13-19, wherein the processing circuitry comprises at least one processor circuit communicatively coupled to at least one memory circuit.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method for determining a position of a body, the method comprising:

counting an atomic clock derived time starting at a current global navigation satellite system (GNSS) time and incremented by a periodic time count from an atomic clock;

attempting to receive a later current GNSS time occurring after the current GNSS time;

determining whether the later current GNSS time is received and valid;

determining that the later current GNSS time is at least one of not received and not valid, then providing an estimated geographical position of the body to a navigation system;

receiving beacon data of each of a plurality of satellites, wherein the beacon data comprises a unique satellite identifier of one of the plurality of satellites and a signal strength of a beacon signal including the unique satellite identifier;

extracting a satellite identifier from each received beacon data;

using each extracted satellite identifier and most recently received orbital data for a plurality of satellites, obtaining orbital data of each satellite whose satellite identifier was extracted;

obtaining a reference time from the most recently received orbital data for the plurality of satellites;

determining a difference time equal to an absolute value of a difference between another current atomic clock derived time and the reference time;

based on a radiation pattern of an antenna array of a satellite receiver configured to receive each beacon signal and minimum detectable signal threshold level of the satellite receiver, defining a bounded area;

using the difference time and an obtained orbital data, generating an estimated probability density function (PDF) of absolute geographical position of each satellite in the bounded area and whose satellite identifier was extracted;

using each estimated PDF of absolute geographical position, generating a representation of estimated PDFs of relative geographical position of each satellite in the bounded area, wherein each such relative geographical position is relative to a most recently (a) estimated position of the body or (b) received valid GNSS position;

using yet another current atomic clock derived time and received beacon data of each satellite whose satellite identifier was extracted, determining (a) angles of arrival of the beacon signal of each satellite, whose satellite identifier was extracted, with respect to the body, and (b) a signal strength of each beacon signal received from a satellite whose satellite identifier was extracted;

using each determined angles of arrival, determining a representation of measured PDFs of relative geographical position for each satellite whose identifier was extracted;

using inertial measurement unit (IMU) data, the representation of the measured PDFs of relative geographical position for each satellite, and the representation of estimated PDFs of relative geographical position of each satellite, determining the estimated geographical position of the body;

determining a measured entry time and a measured exit time of each satellite, and a gradient, over the bounded area, of a strength of the beacon signal of each satellite whose identifier was extracted over the bounded area; and for each satellite whose identifier was extracted, adding the measured entry time, the measured exit time, and the gradient of a strength of the beacon signal of each satellite whose identifier was extracted to the representation of measured PDFs of relative position of each satellite.

2. The method of claim 1, further comprising receiving the orbital data for the plurality of satellites.

3. The method of claim 1, wherein determining that the GNSS time is valid comprises determining that whether a difference between a GNSS provided geographical position of the body and the estimated geographical position of the body exceeds a predetermined threshold value.

4. The method of claim 1, wherein at least one of:

(a) the estimated PDF of relative geographical position of a satellite whose identifier was extracted comprises an estimated entry time of the satellite into the bounded area when the representation of a measured PDF of relative position of the satellite comprises the measured entry time of the satellite into the bounded area;

(b) the estimated PDF of relative geographical position of a satellite whose identifier was extracted comprises an estimated exit time of the satellite out of the bounded area when the representation of the measured PDF of relative position of the satellite comprises the measured exit time of the satellite out of the bounded area; and (c) the estimated PDF of relative geographical position of a satellite whose identifier was extracted comprises a gradient of an estimated distance between the body and the satellite when the representation of the measured PDF of relative position of the satellite comprises the gradient, in the bounded area, of the signal strength of a beacon of the satellite.

5. The method of claim 1, wherein the beacon data is received from each of at least three receiver channels, of the satellite receiver, each of which is electromagnetically coupled to a unique antenna of the antenna array.

6. The method of claim 1, wherein determining whether the later current GNSS time is valid is determined by a validator.

7. A non-transitory computer readable medium storing a program causing at least one processor to execute a process to determine a position of a body, the process comprising:

counting an atomic clock derived time starting at a current global navigation satellite system (GNSS) time and incremented by a periodic time count from an atomic clock;

attempting to receive a later current GNSS time occurring after the current GNSS time;

determining whether the later current GNSS time is received and valid;

determining that the later current GNSS data is at least one of not received and not valid, then causing provision of an estimated geographical position of the body to a navigation system;

receiving beacon data of each of a plurality of satellites, wherein the beacon data comprises a unique satellite identifier of one of the plurality of satellites and a signal strength of a beacon signal including the unique satellite identifier;

extracting a satellite identifier from each received beacon data;

using each extracted satellite identifier and most recently received orbital data for a plurality of satellites, obtaining orbital data of each satellite whose satellite identifier was extracted;

obtaining a reference time from the most recently received orbital data for the plurality of satellites;

determining a difference time equal to an absolute value of a difference between another current atomic clock derived time and the reference time;

based on a radiation pattern of an antenna array of a satellite receiver configured to receive each beacon signal and minimum detectable signal threshold level of the satellite receiver, defining a bounded area;

using the difference time and an obtained orbital data, generating an estimated probability density function (PDF) of absolute geographical position of each satellite in the bounded area and whose satellite identifier was extracted;

using each estimated PDF of absolute geographical position, generating a representation of estimated PDFs of relative geographical position of each satellite in the bounded area, wherein each such relative geographical position is relative to a most recently (a) estimated position of the body or (b) received valid GNSS position;

using yet another current atomic clock derived time and received beacon data of each satellite whose satellite identifier was extracted, determining (a) angles of arrival of the beacon signal of each satellite, whose satellite identifier was extracted, with respect to the body, and (b) a signal strength of each beacon signal received from a satellite whose satellite identifier was extracted;

using each determined angles of arrival, determining a representation of measured PDFs of relative geographical position for each satellite whose identifier was extracted;

using inertial measurement unit (IMU) data, the representation of the measured PDFs of relative geographical position for each satellite, and the representation of estimated PDFs of relative geographical position of each satellite, determining the estimated geographical position of the body;

determining a measured entry time and a measured exit time of each satellite, and a gradient, over the bounded area, of a strength of the beacon signal of each satellite whose identifier was extracted over the bounded area; and for each satellite whose identifier was extracted, adding the measured entry time, the measured exit time, and the gradient of a strength of the beacon signal of each satellite whose identifier was extracted to the representation of measured PDFs of relative position of each satellite.

8. The non-transitory computer readable medium of claim 7, wherein the process further comprises receiving the orbital data for the plurality of satellites.

9. The non-transitory computer readable medium of claim 7, wherein determining that the GNSS time is valid comprises determining that whether a difference between a GNSS provided geographical position of the body and the estimated geographical position of the body exceeds a predetermined threshold value.

10. The non-transitory computer readable medium of claim 7, wherein at least one of:

(a) the estimated PDF of relative geographical position of a satellite whose identifier was extracted comprises an estimated entry time of the satellite into the bounded area when the representation of a measured PDF of relative position of the satellite comprises the measured entry time of the satellite into the bounded area;

(b) the estimated PDF of relative geographical position of a satellite whose identifier was extracted comprises an estimated exit time of the satellite out of the bounded area when the representation of the measured PDF of relative position of the satellite comprises the measured exit time of the satellite out of the bounded area; and (c) the estimated PDF of relative geographical position of a satellite whose identifier was extracted comprises a gradient of an estimated distance between the body and the satellite when the representation of the measured PDF of relative position of the satellite comprises the gradient, in the bounded area, of the signal strength of a beacon of the satellite.

11. The non-transitory computer readable medium of claim 7, wherein the beacon data is received from each of at least three receiver channels, of the satellite receiver, each of which is electromagnetically coupled to a unique antenna of the antenna array.

12. The non-transitory computer readable medium of claim 7, wherein determining whether the later current GNSS time is valid is determined by a validator.

13. An apparatus for determining a position of a body, the apparatus comprising:

a satellite receiver on or in the body, wherein the satellite receiver comprises an antenna array on or in the body;

an atomic clock on or in the body and configured to provide a periodic time count;

a global navigation satellite system (GNSS) receiver on or in the body;

an inertial measurement unit on or in the body and comprising at least one of: at least one accelerometer and at least one gyroscope, a processing circuitry on or in the body and communicatively coupled to each of the satellite receiver, the atomic clock, the GNSS receiver, and the inertial measurement unit;

wherein the processing circuitry is configured to:

count an atomic clock derived time starting at a current GNSS time from the GNSS receiver and incremented by the periodic time count received from the atomic clock;

attempt to receive a later current GNSS time occurring after the current GNSS time;

determine whether the later current GNSS time is received and valid;

determining that the later current GNSS time is at least one of not received and not valid, then use an estimated geographical position of the body to provide information about the position of the body with respect to an intended destination of the body;

receive beacon data of each of a plurality of satellites, wherein the beacon data comprises a unique satellite identifier of one of the plurality of satellites and a signal strength of a beacon signal including the unique satellite identifier;

extract a satellite identifier from each received beacon data;

using each extracted satellite identifier and most recently received orbital data for a plurality of satellites, obtain orbital data of each satellite whose satellite identifier was extracted;

obtain a reference time from the most recently received orbital data for the plurality of satellites;

determine a difference time equal to an absolute value of a difference between another current atomic clock derived time and the reference time;

based on a radiation pattern of an antenna array of a satellite receiver configured to receive each beacon signal and minimum detectable signal threshold level of the satellite receiver, define a bounded area;

using the difference time and an obtained orbital data, generate an estimated probability density function (PDF) of absolute geographical position of each satellite in the bounded area and whose satellite identifier was extracted;

using each estimated PDF of absolute geographical position, generate a representation of estimated PDFs of relative geographical position of each satellite in the bounded area, wherein each such relative geographical position is relative to a most recently (a) estimated position of the body or (b) received valid GNSS position;

using yet another current atomic clock derived time and received beacon data of each satellite whose satellite identifier was extracted, determine (a) angles of arrival of the beacon signal of each satellite, whose satellite identifier was extracted, with respect to the body, and (b) a signal strength of each beacon signal received from a satellite whose satellite identifier was extracted;

using each determined angles of arrival, determine a representation of measured PDFs of relative geographical position for each satellite whose identifier was extracted;

using inertial measurement unit (IMU) data, the representation of the measured PDFs of relative geographical position for each satellite, and the representation of estimated PDFs of relative geographical position of each satellite, determine the estimated geographical position of the body;

determine a measured entry time and a measured exit time of each satellite, and a gradient, over the bounded area, of a strength of the beacon signal of each satellite whose identifier was extracted over the bounded area; and for each satellite whose identifier was extracted, adding the measured entry time, the measured exit time, and the gradient of a strength of the beacon signal of each satellite whose identifier was extracted to the representation of measured PDFs of relative position of each satellite.

14. The apparatus of claim 13, further comprising an auxiliary receiver communicatively coupled to the processing circuitry and configured to receive the orbital data for the plurality of satellites and to provide the orbital data for the plurality of satellites to the processing circuitry.

15. The apparatus of claim 13, wherein determining that the GNSS time is valid comprises determining that whether a difference between a GNSS provided geographical position of the body and the estimated geographical position of the body exceeds a predetermined threshold value.

16. The apparatus of claim 13, wherein at least one of:

(a) the estimated PDF of relative geographical position of a satellite whose identifier was extracted comprises an estimated entry time of the satellite into the bounded area when the representation of a measured PDF of relative position of the satellite comprises the measured entry time of the satellite into the bounded area;

(b) the estimated PDF of relative geographical position of a satellite whose identifier was extracted comprises an estimated exit time of the satellite out of the bounded area when the representation of the measured PDF of relative position of the satellite comprises the measured exit time of the satellite out of the bounded area; and (c) the estimated PDF of relative geographical position of a satellite whose identifier was extracted comprises a gradient of an estimated distance between the body and the satellite when the representation of the measured PDF of relative position of the satellite comprises the gradient, in the bounded area, of the signal strength of a beacon of the satellite.

17. The apparatus of claim 13, wherein the beacon data is received from each of at least three receiver channels, of the satellite receiver, each of which is electromagnetically coupled to a unique antenna of the antenna array.

18. The apparatus of claim 13, further comprising GNSS validator circuitry communicatively coupled to the processing circuitry and configured to determine whether the later current GNSS time is valid and communicate validity determination to the processing circuitry.

19. The apparatus of claim 13, wherein the processing circuitry comprises a Kalman filter and configured to determine the estimated geographical position of the body.

20. The apparatus of claim 13, wherein the processing circuitry comprises at least one processor circuit communicatively coupled to at least one memory circuit.

* * * * *